(12) United States Patent
Jayam et al.

(10) Patent No.: US 6,981,014 B2
(45) Date of Patent: Dec. 27, 2005

(54) SYSTEMS AND METHODS FOR HIGH SPEED DATA TRANSMISSION USING TCP/IP

(75) Inventors: Ramkumar Jayam, San Jose, CA (US); Anil Kapatkar, San Jose, CA (US); Sivakumar Munnangi, Santa Clara, CA (US); Srinivasan Venkataraman, Fremont, CA (US)

(73) Assignee: Adaptec Corporation, Milpitas, CA (US)

( * ) Notice: Subject to any disclaimer, the term of this patent is extended or adjusted under 35 U.S.C. 154(b) by 230 days.

(21) Appl. No.: 10/233,302

(22) Filed: Aug. 30, 2002

(65) Prior Publication Data

US 2003/0110271 A1    Jun. 12, 2003

Related U.S. Application Data

(60) Provisional application No. 60/316,651, filed on Aug. 31, 2001.

(51) Int. Cl.$^7$ ............................................. G06F 13/00
(52) U.S. Cl. ....................... 709/200; 709/228; 709/230
(58) Field of Search ............................... 709/230, 200, 709/227, 228, 237

(56) References Cited

U.S. PATENT DOCUMENTS

| | | | |
|---|---|---|---|
| 5,590,281 A * | 12/1996 | Stevens | ....................... 709/227 |
| 5,600,793 A | 2/1997 | Nord | |
| 5,678,008 A | 10/1997 | Hin | |
| 6,067,300 A * | 5/2000 | Baumert et al. | ............. 370/413 |
| 6,098,108 A * | 8/2000 | Sridhar et al. | ............... 709/239 |
| 6,246,684 B1 | 6/2001 | Chapman et al. | |
| 6,393,023 B1 | 5/2002 | Shimizu et al. | |
| 6,457,121 B1 | 9/2002 | Koker et al. | |
| 6,760,769 B2 * | 7/2004 | Jayam et al. | ................ 709/228 |

OTHER PUBLICATIONS

International Preliminary Examination Report dated May 8, 2003, PCT/US02-27707.
International Search Report in International Application No. PCT/US02/277097 mailed Dec. 18, 2002 (4 pages).
International Search Report in International Application No. PCT/US02/27709 mailed Nov. 5, 2002 (5 pages).

* cited by examiner

*Primary Examiner*—Kenneth R. Coulter
(74) *Attorney, Agent, or Firm*—IP Strategy Group, PC

(57) ABSTRACT

A method for exchanging data in a first host computer coupled to a network. The network is also coupled to a second host computer. The method includes employing a first Transmit Control Block (Tx TCB) to facilitate transmitting first data associated with a bi-directional data flow from the first host computer to the second host computer. The first data is transmitted using the TCP protocol. The first Tx TCB is associated with the first host computer and is configured for storing transmit-facilitating parameters associated with the transmitting the first data using the TCP protocol. The method also includes employing a first Receive Control Block (Rx TCB) to facilitate receiving second data associated with the bi-directional data flow. The second data is transmitted from the second host computer to the first host computer using the TCP protocol. The first Rx TCB is associated with the first host computer and is configured for storing receive-facilitating parameters associated with the receiving the second data using the TCP protocol. In accordance with this embodiment of the invention, the first Tx TCB and the first Rx TCB are employed to simultaneously service a transmit request pertaining the first data and a receive request pertaining the second data.

25 Claims, 14 Drawing Sheets

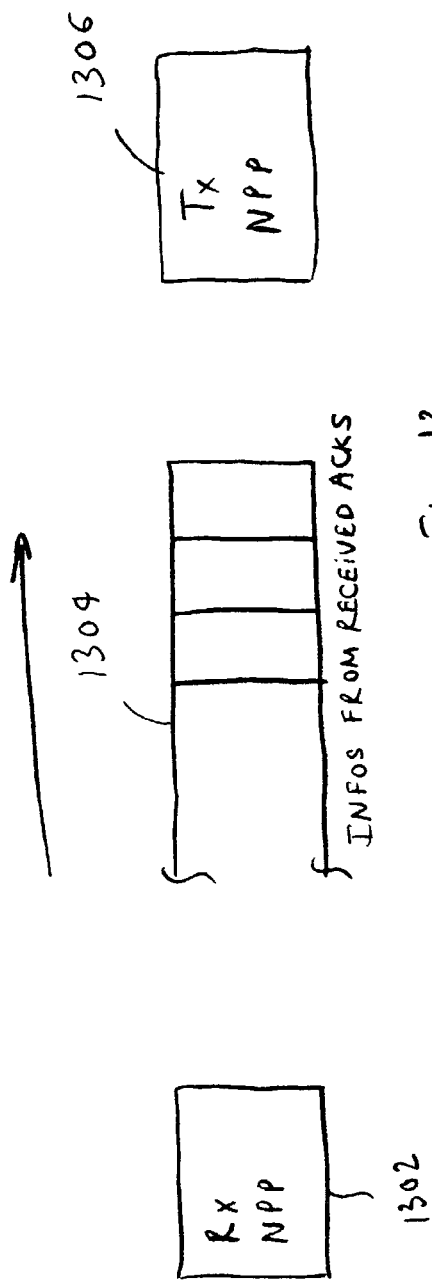

SYSTEMS AND METHODS FOR HIGH SPEED DATA TRANSMISSION USING TCP/IP

This application claims priority under 35 USC 119(e) of the following patent application, which is incorporated by reference herein METHOD OF IMPLEMENTING TRANSMISSION CONTROL PROTOCOL/INTERNET PROTOCOL IN HARDWARE (A/N 60/316,651, filed Aug. 31, 2001).

This application incorporates by reference the following patent applications
1. APPARATUS AND METHODS FOR TRANSMITTING DATA AT HIGH SPEED USING TCP/IP, filed on even date herewith, U.S. application Ser. No. 10/232,819, now U.S. Pat. No. 6,760,769 B2 granted Jul. 6, 2004.
2. APPARATUS AND METHODS FOR RECEIVING DATA AT HIGH SPEED USING TCP/IP, filed on even date herewith, U.S. application Ser. No. 10/232,821.
3. METHODS AND APPARATUS FOR PARTIALLY REORDERING DATA PACKETS, filed on even date herewith, U.S. application Ser. No. 10/233,304
4. SYSTEMS AND METHODS FOR IMPLEMENTING HOST-BASED SECURITY IN A COMPUTER NETWORK, filed on even date herewith, U.S. application Ser. No. 10/233,303.

BACKGROUND OF THE INVENTION

The present invention relates to data communication using a computer network. More particularly, the present invention relates to improved methods and apparatus for transmitting data among a plurality of computer systems.

The use of the transmission control protocol/internet protocol (TCP/IP) to facilitate the transmission of information between two or more computer systems via one or more networks is well known. When a given networked computer wishes to exchange information with another networked computer, a bi-directional data flow is established to computer. Generally speaking, the information is broken into packets to facilitate the transmission process. The TCP/IP protocol suite ensures that the information to be transferred is properly segmented and sent from the transmitting computer as packets, as well as properly received and assembled into the complete data file at the receiving computer.

As is well known, the transmission control protocol (TCP) corresponds to the transport layer (layer 4) of the OSI reference model. The transmission control protocol offers, among others, stream data transfer, multiplexing, full duplex operation, segmentation and reassembly, and efficient flow control. The internet protocol (IP) is a network layer (layer 3) protocol that provides, among others, addressing information and some control information that enables packets to be routed. The IP protocol has two primary responsibilities: providing connectionless, best-effort delivery of datagrams to a network, and providing fragmentation and reassembly of datagrams to support data links with different maximum transmission units (MTU) sizes. Together, these two protocols form the core of the internet protocol suite that enables reliable delivery of data via a network.

When two computers communicate via a computer network using the TCP/IP protocol, a data structure known as a transmission control block (TCB) is typically employed to facilitate data transmission, segmentation, reassembly, retransmission, acknowledgement, and the like of datagrams in the bi-directional data flow between the communicating computers. The TCB is employed to track various parameters associated with the data transmit and receive process for a given data flow. Generally speaking, there is one transmission control block per data flow at each host computer system (i.e., the computer system involved in the communication at each end of a data flow). Each TCB is uniquely identified by its TCP source port, TCP destination port, IP source address, and/or IP destination address.

In the prior art, a transmission control block in a host computer is employed, for a given data flow, to facilitate both the transmission of data from that host computer and the receiving of data into that host computer. FIG. 1 illustrates this situation wherein a TCB 102 is employed to facilitate both the transmission and the receiving of data for host computer 104. Likewise, a TCB 106 is employed to facilitate both the transmission and the receiving of data for host computer 108. However, if a transmission control block is busy servicing a transmission request in a host computer, it is unavailable for use to facilitate the receiving of data in that host computer until the transmit task is finished. Accordingly, a bottleneck exists which limits the transmission bandwidth between the two host computers.

If the data transmission speed between host computer 104 and host computer 108 is relatively low compared to the speed at which data is processed within the host computers, this bottleneck may be tolerable. As the transmission bandwidth between host computers increase, this bandwidth bottleneck increasingly becomes a critical issue. As bandwidth approaches 1 Gbits/sec, 10 Gbits/sec, or even higher for enterprise networking, and up to 40 Gbits/sec or higher among network routers, it is clear that the bandwidth bottleneck needs to be resolved if TCP/IP is to remain a viable protocol suite for networking going forward.

In view of the foregoing, there is desired improved methods and apparatus for relieving the bandwidth bottleneck associated with the prior art transmission control block and for improving the data transmission speeds when two or more computers communicate using the TCP/IP protocol via a computer network.

SUMMARY OF THE INVENTION

The invention relates, in one embodiment, to a method for exchanging data in a first host computer coupled to a network. The network is also coupled to a second host computer. The method includes employing a first Transmit Control Block (Tx TCB) to facilitate transmitting first data associated with a bi-directional data flow from the first host computer to the second host computer. The first data is transmitted using the TCP protocol. The first Tx TCB is associated with the first host computer and is configured for storing transmit-facilitating parameters associated with the transmitting the first data using the TCP protocol. The method also includes employing a first Receive Control Block (Rx TCB) to facilitate receiving second data associated with the bi-directional data flow. The second data is transmitted from the second host computer to the first host computer using the TCP protocol. The first Rx TCB is associated with the first host computer and is configured for storing receive-facilitating parameters associated with the receiving the second data using the TCP protocol. In accordance with this embodiment of the invention, the first Tx TCB and the first Rx TCB are employed to simultaneously service a transmit request pertaining the first data and a receive request pertaining the second data.

In another embodiment, the invention relates to circuitries for facilitating data exchange via a network. The circuitries are associated with a first host computer coupled to said network. The network is also coupled to a second host computer. The circuitries include means for facilitating transmitting first data associated with a bi-directional data flow from the first host computer to the second host computer. The first data is transmitted using the TCP protocol. The means for facilitating transmitting is associated with the first host computer and is configured for storing transmit-facilitating parameters associated with transmitting the first data using the TCP protocol. The circuitries also include means for facilitating receiving second data associated with the bi-directional data flow. The second data is transmitted from the second host computer to the first host computer using the TCP protocol. The means for facilitating receiving is associated with the first host computer and is configured for storing receive-facilitating parameters associated with receiving the second data using the TCP protocol. In accordance with this embodiment of the invention, the means for facilitating transmitting and the means for facilitating receiving are employed simultaneously to facilitate simultaneous transmitting the first data and receiving the second data by the circuitries.

In yet another embodiment, the invention relates to a method on a network interface card (NIC card) coupled to a first host computer for exchanging data via a network coupled to the first host computer and a second host computer. The method includes transmitting, using transmit-facilitating parameters stored in a first Tx Transmit Control Block (Tx TcB) associated with the NIC card, first data associated with a bi-directional data flow. The first data is transmitted from the first host computer to the second host computer. The first data is transmitted using the TCP protocol. The method also includes receiving, using receive-facilitating parameters stored in a first Rx Transmit Control Block (Rx TcB) associated with the NIC card, second data associated with the bi-directional data flow. The second data is transmitted from the second host computer to the first host computer. The second data is transmitted using the TCP protocol. In accordance with this embodiment of the invention, the Tx TcB and the Rx TcB are employed to facilitate simultaneous transmitting the first data and receiving the second data by the NIC card.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 illustrates, in accordance with one embodiment of the present invention, the steps taken by the receive process in response to the receipt of an acknowledgement packet.

FIG. 14 illustrates, in accordance with one embodiment of the present invention, the steps taken by the receive process in response to the receipt of one or more data packets that contain data other than acknowledgement for data previously sent.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 2:
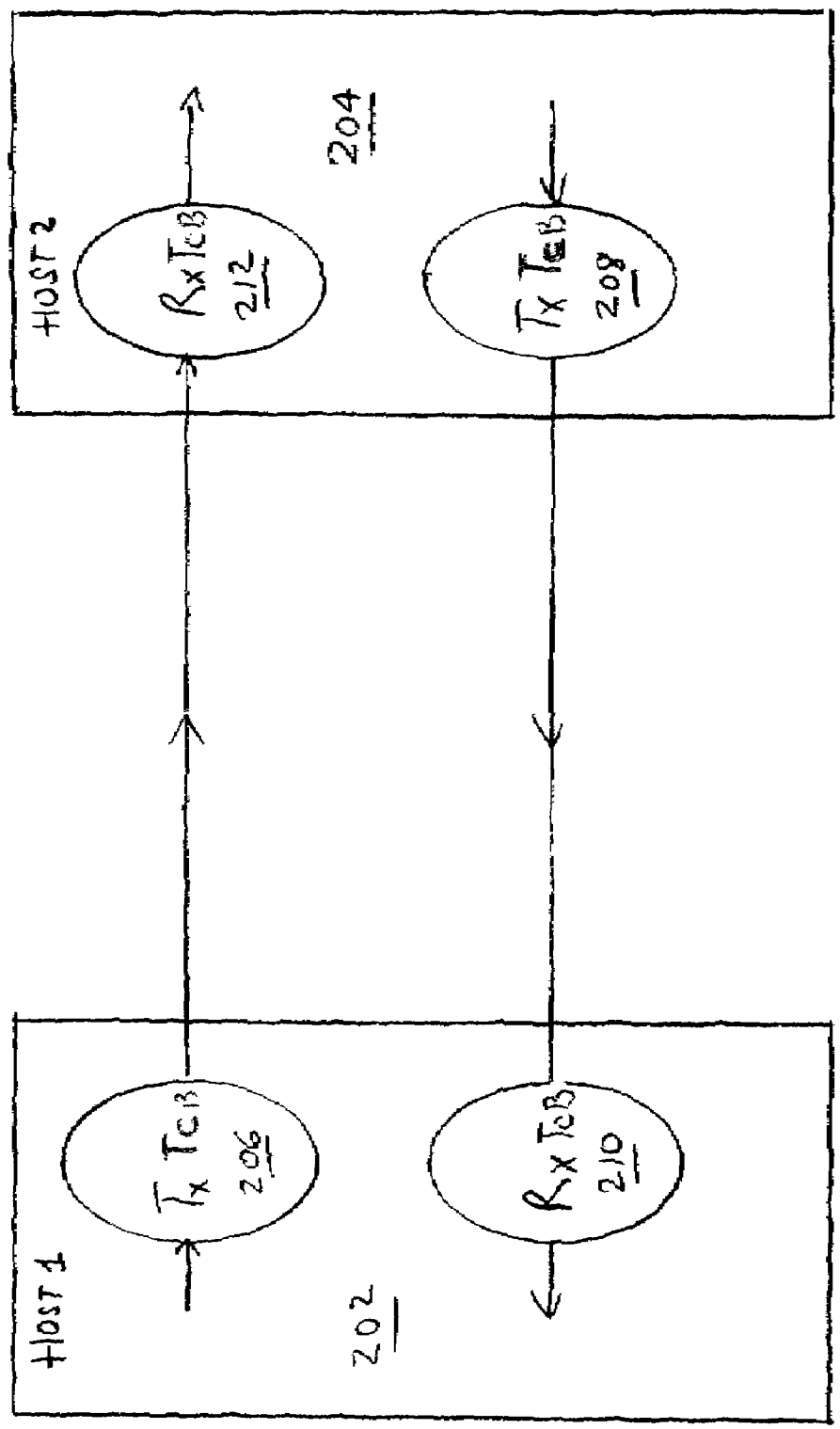
FIG. 2 shows, in accordance with one embodiment of the present invention, a simplified diagram showing a first host computer exchanging data with a second host computer using the inventive transmit control block (Tx TCB) and the inventive receive control block (Rx TCB) of the present invention.

FIG. 2 shows, in accordance with one aspect of the present invention, a simplified diagram showing a host computer 202 exchanging data with a host computer 204 using the inventive transmit control block (Tx TCB) and the inventive receive control block (Rx TCB) of the present invention. As shown in FIG. 2, there is one transmit control block (Tx TCB) for each data flow in each of the host computers. The transmit control block (Tx TCB) is provided in a host computer and is employed during the data transmit process. Thus, each bi-directional flow of data is associated with two transmit control blocks (Tx TCBs) if both host computers at the two ends of the data flow are involved in transmitting data to one another. This is shown by transmit control blocks 206 and 208 in host computers 202 and 204 respectively. For receiving data, each host computer at the two ends of the bi-directional data flow also has a receive control block (Rx TCB). Thus, each bi-directional flow of data is associated with two receive control blocks (Rx TCBs) if both host computers at the two ends of the data flow are permitted to receive data from one another. This is shown by receive control blocks 210 and 212 in host computers 202 and 204 respectively.

Within each host computer, since each bi-directional data flow is provided with a separate data control block for the transmit process (i.e., the transmit control block or Tx TCB) and a separate data control block for the receive process (i.e., the receive control block or Rx TCB), that host computer can simultaneously process transmit and receive requests using two different data control blocks. For example, host computer 202 can service simultaneously a transmit request using Tx TCB 206 and a receive request using Rx TCB 210. As the term is employed herein, processes occurring simultaneously denotes that the sub-step or sub-process of one can be executed even before the other process is finished. For example, two processes executed in two different processing circuits (such as two parallel processors) can occur simultaneously. Further, two processes executed in two different threads by a single processing circuit can be deemed to occur simultaneously even if the processing circuit, by its nature, can execute only one instruction at a time.

Figure 1:
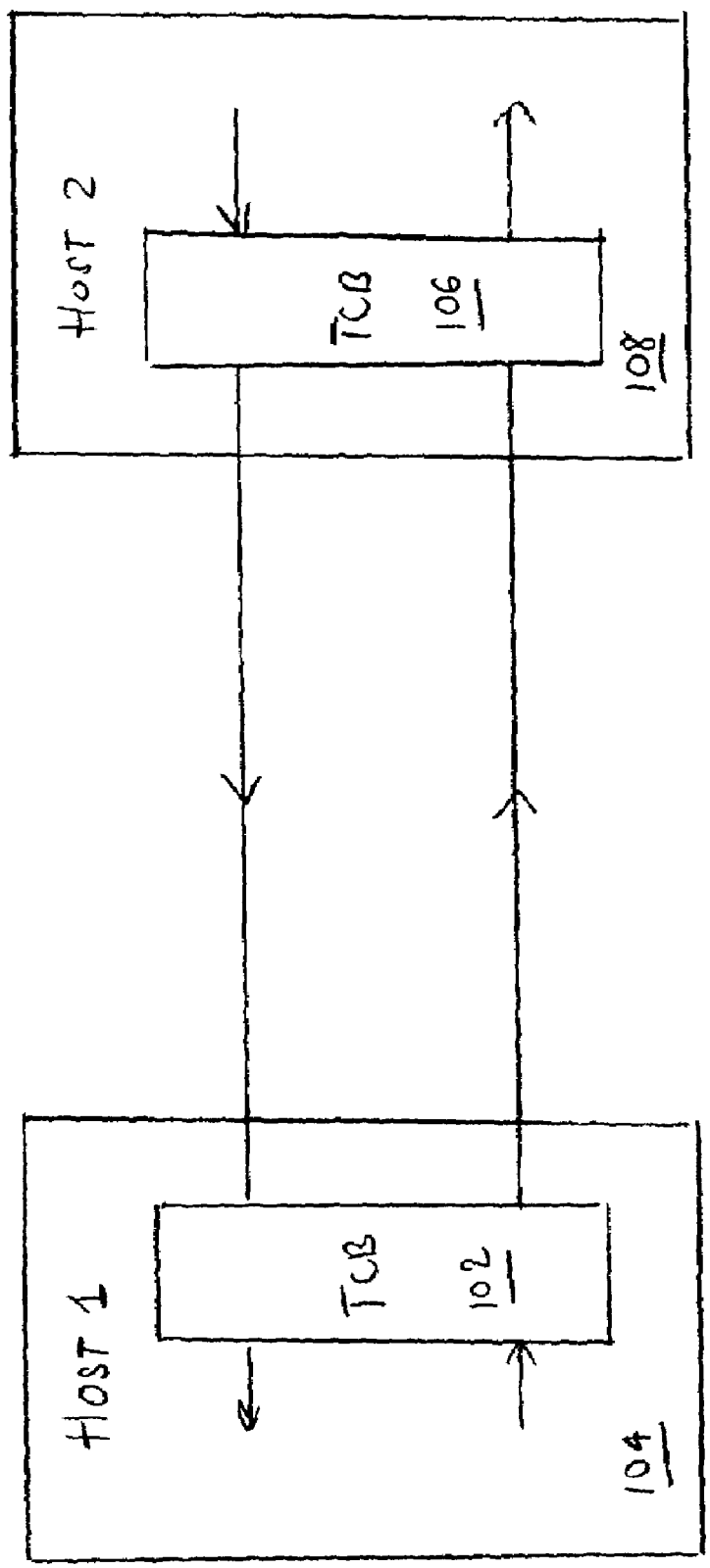
FIG. 1 illustrates this situation wherein a prior art TCB is employed to facilitate both the transmitting and the receiving processes for host computer, thereby enabling only one process to occur at any given time.

In the context of the present invention, the transmit request pertaining to certain packets pertaining to a bi-directional data flow can be serviced simultaneously with the servicing of a receive request pertaining to other packets of that bi-directional data flow. This is different from the situation in FIG. 1 wherein the host computer, such as host computer 104, must wait until the servicing of the transmit request is done and the prior art TCB (such as TCB 102) is released before having access to that TCB in order to service the receive request (or vice versa).

As the term is employed herein, a host computer refers to a computer-implemented device having a processor and at least one I/O port for transmitting and receiving data (hence the term "host"). It is not necessary, as the term is employed herein, for a host computer to have a keyboard or other user data entry arrangements. Further, it is not necessary, as the term is employed herein, for a host computer to have a data display device, such as a computer display screen. As such, a host computer, as the term is employed herein, may include a storage area network (SAN) arrangement, network attached storage (NAS), a data storage device having a processor for communicating with other devices via a network, and/or indeed any other computer-implemented device having a processor and capable of communicating via a network.

Figure 3:
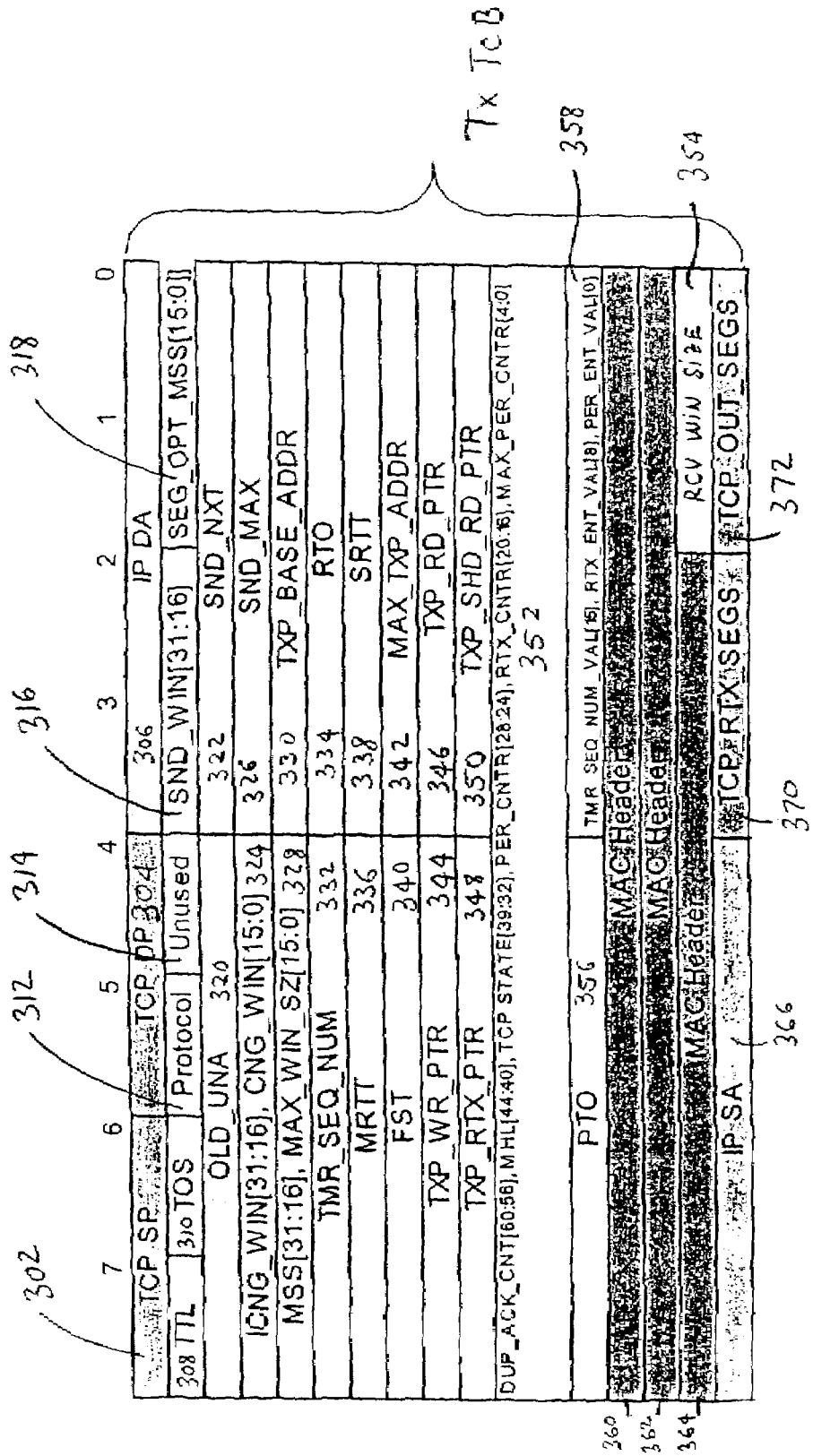
FIG. 3 shows, in accordance with one embodiment of the present invention, a transmit control block data structure for facilitating transmitting data.

FIG. 3 shows, in accordance with one embodiment of the present invention, a transmit control block (Tx TCB) 300 data structure for facilitating transmitting data. Referring now to FIG. 3, transmit control block (Tx TCB) 300 has, among others, four major groups of transmit-facilitating parameters (i.e., parameters employed to facilitate the transmit process): TX header, TX window management, TX queues management, and TX timer management. The more important TX header parameters include TCP source port (TCP SP) 302, TCP destination port (TCP DP) 304, IP source address (IP SA) 366, IP destination address (IP DA) 306, the sequence number to be sent next (SND_NXT) 322, the window size of the transmitting host computer (SND_WIN) 316, the Optimal Maximum Segment Size (SEG_OPT_MSS) 318, the current congestion window (ICNG_WIN/CNG_WIN) 324.

The more important TX window management parameters include the current congestion window (ICNG_WIN/CNG_WIN) 324, the old unacknowledged sequence number (OLD_UNA) 320, the sequence number to be sent next (SND_NXT) 322, the maximum sequence number to be sent (SND_MAX) 326, the window size of the transmitting host computer (SND_WIN) 316.

The more important TX queue management parameters include Transmit Pending Read Pointer (TXP_RD_PTR) 346, Transmit Pending Write Pointer (TXP_WR_PTR) 344, Retransmit Shadow Pointer (TXP_SHD_RD_PTR) 350, Retransmit Read Pointer (TXP_RTX_PTR) 348, Transmit Queue Base Address (TXP_BASE_ADDR) 330, and Transmit Queue Maximum Address (MAX_TXP_ADDR) 342.

The more important TX timer management parameters include the Retransmission Time Out value RTO 334, the Frame Transmit Timer FST 340, the Smoothened Round Trip Time (SRTT) 338, the Measured Round Trip Time (MRTT) 336, and the Sequence number of the segment for which timer measurements are kicked off (TMR_SEQ_NUM) 332.

Figure 4:
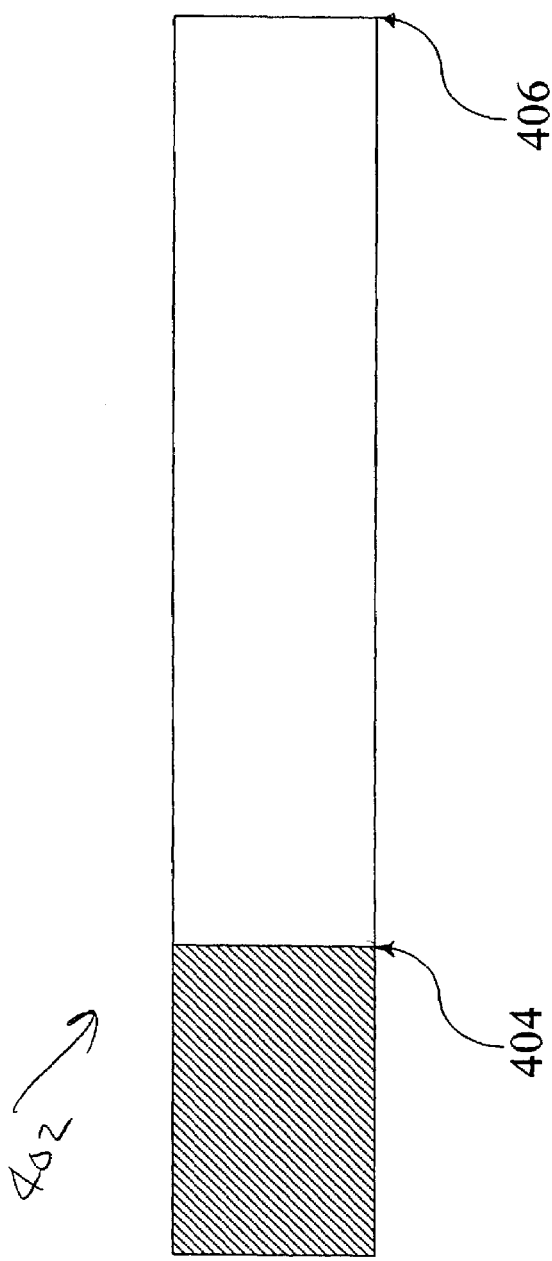
FIG. 4 illustrates, in accordance with one embodiment of the present invention, a transmit window, which conceptually represents the amount of data allowed to be transmitted from the transmitting host computer for a given data flow at any given time.

The operation of transmit control block (Tx TCB) 300 may be better understood with reference to the figures that follow. Integral to the concept of a transmit control block (Tx TCB) are the concepts of transmit window management and queue management. FIG. 4 illustrates in a simplified format a transmit window 402, which conceptually represents the amount of data allowed to be transmitted from the transmitting host computer for a given data flow at any given time. Transmit window 402 may have a size of, for example, 64 Kb although the exact value may vary with implementations. Whenever there is a request to transmit a packet (generally from the host application software), the packet is buffered and transmit window 402 is checked (via parameter SND_WIN 316 in the transmit control block 300) to see whether there is sufficient transmit bandwidth to send out the packet.

Transmit window 402 may have a slow start feature; that is, transmit window 402 starts out being rather small, e.g., up to first window size 404 (generally 1 MSS or 1 Maximum Segment Size). This allows a small amount of data to be transmitted from the host computer in the beginning. If the host computer at the other end sends an acknowledgement timely, transmit window 402 gradually opens up further to allow more data to be transmitted through, up to a maximum size indicated by maximum window size 406. If an expected acknowledgement is not timely received, transmit window 402 shrinks to its minimum size again, or to some value smaller than the value it had when the acknowledgement period expires. In this manner, transmit window 402 performs the function of congestion control at the transmitting host computer.

Figure 5:
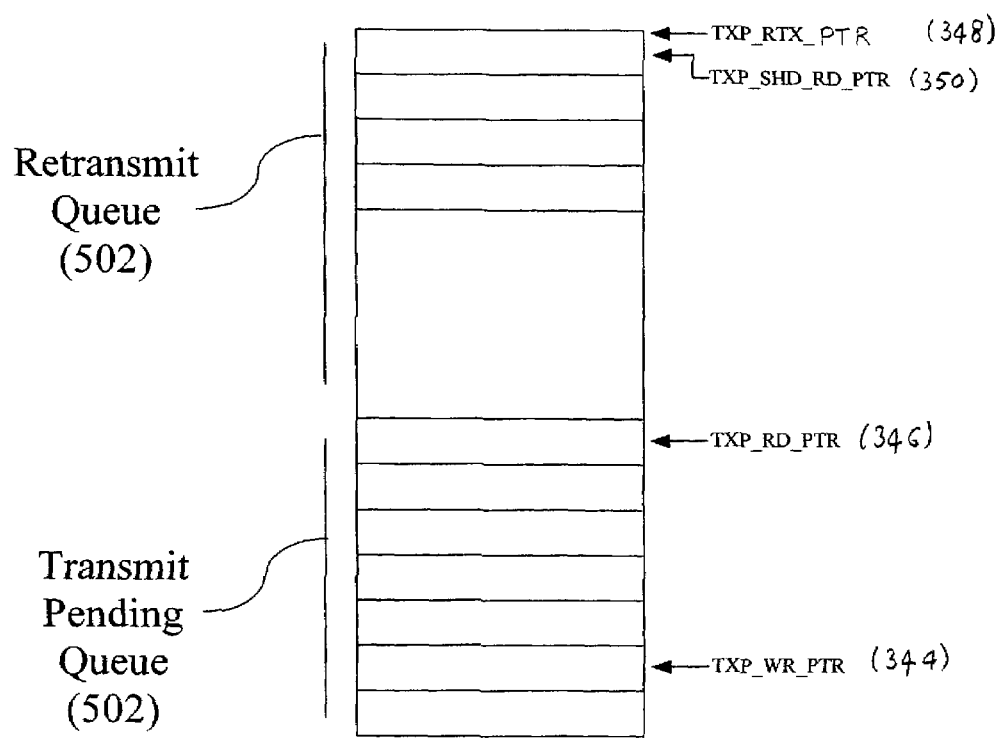
FIG. 5 illustrates, in accordance with one aspect of the present invention, a retransmit queue and a transmit pending queue.

FIG. 5 illustrates, in accordance with one aspect of the present invention, a retransmit queue 502 and a transmit pending queue 504. Transmit pending queue 504 is employed to queue transmit elements, which may include either the packet to be transmitted from the host computer associated with the transmit control block (Tx TCB) or, more commonly, a pointer to that packet. A transmit element may also include data associated with the packet to be transmitted such as the starting sequence number and the length of the packet.

If the transmit window size is sufficient to transmit a packet, that packet is transmitted and a copy (or its pointer and/or associated data) is placed into the retransmit queue 502. On the other than, a packet (or its pointer and associated data) to be transmitted is placed into transmit pending queue 504 when the transmit window size is insufficient to transmit that packet. Transmit pending queue 504 is managed by two pointers: Transmit Pending Read Pointer (TXP_RD_PTR) 346 and Transmit Pending Write Pointer (TXP_WR_PTR) 344. Transmit Pending Read Pointer (TXP_RD_PTR) 346 points to the top of the transmit queue and specifically to the queue element to be sent next when the transmit window is available. Transmit Pending Write Pointer (TXP_WR_PTR) 344 is the tail of the transmit queue and represents the last inserted transmit element. When a packet is sent out from transmit pending queue 504, Transmit Pending Read Pointer (TXP_RD_PTR) 346 moves toward Transmit Pending Write Pointer (TXP_WR_PTR) 344. Thus, the difference between Transmit Pending Write Pointer (TXP_WR_PTR) 344 and Transmit Pending Read Pointer (TXP_RD_PTR) 346 represents the size of the transmit queue at any given point in time, which reflects the number of pending packets to be sent.

After being sent, a packet is moved to retransmit queue 502. In retransmit queue 502, the packet awaits acknowledgement from the other host computer before being dequeued. Retransmit queue 502 is managed by two pointers: Retransmit Shadow Pointer (TXP_SHD_RD_PTR) 350 and Retransmit Read Pointer (TXP_RTX_PTR) 348.

In most cases, Retransmit Read Pointer (TXP_RTX_PTR) 348 and Retransmit Shadow Pointer (TXP_SHD_RD_PTR) 350 point at the same retransmit queue element. During retransmit, Retransmit Read Pointer (TXP_RTX_PTR) 348 advances while Retransmit Shadow Pointer (TXP_SHD_RD_PTR) 350 stays, acting as a shadow pointer. Retransmit Shadow Pointer (TXP_SHD_RD_PTR) 350 is advanced only when an acknowledgement is received for the point retransmitted. If all retransmitted packets are acknowledged, Retransmit Shadow Pointer (TXP_SHD_RD_PTR) 350 and Retransmit Read Pointer (TXP_RTX_PTR) 348 will catch up with one another and will point at the same queue element again.

For convenience, retransmit queue 502 and transmit pending queue 504 may be implemented together as a circular queue and occupy a contiguous block of memory. However, the use of Retransmit Read Pointer (TXP_RTX_PTR) 348, Retransmit Shadow Pointer (TXP_SHD_RD_PTR) 350, Transmit Pending Read Pointer (TXP_RD_PTR) 346, and Transmit Pending Write Pointer (TXP_WR_PTR) 344 allow this retransmit queue 502 and transmit pending queue 504 to be managed as two different logical queues.

Figure 6:
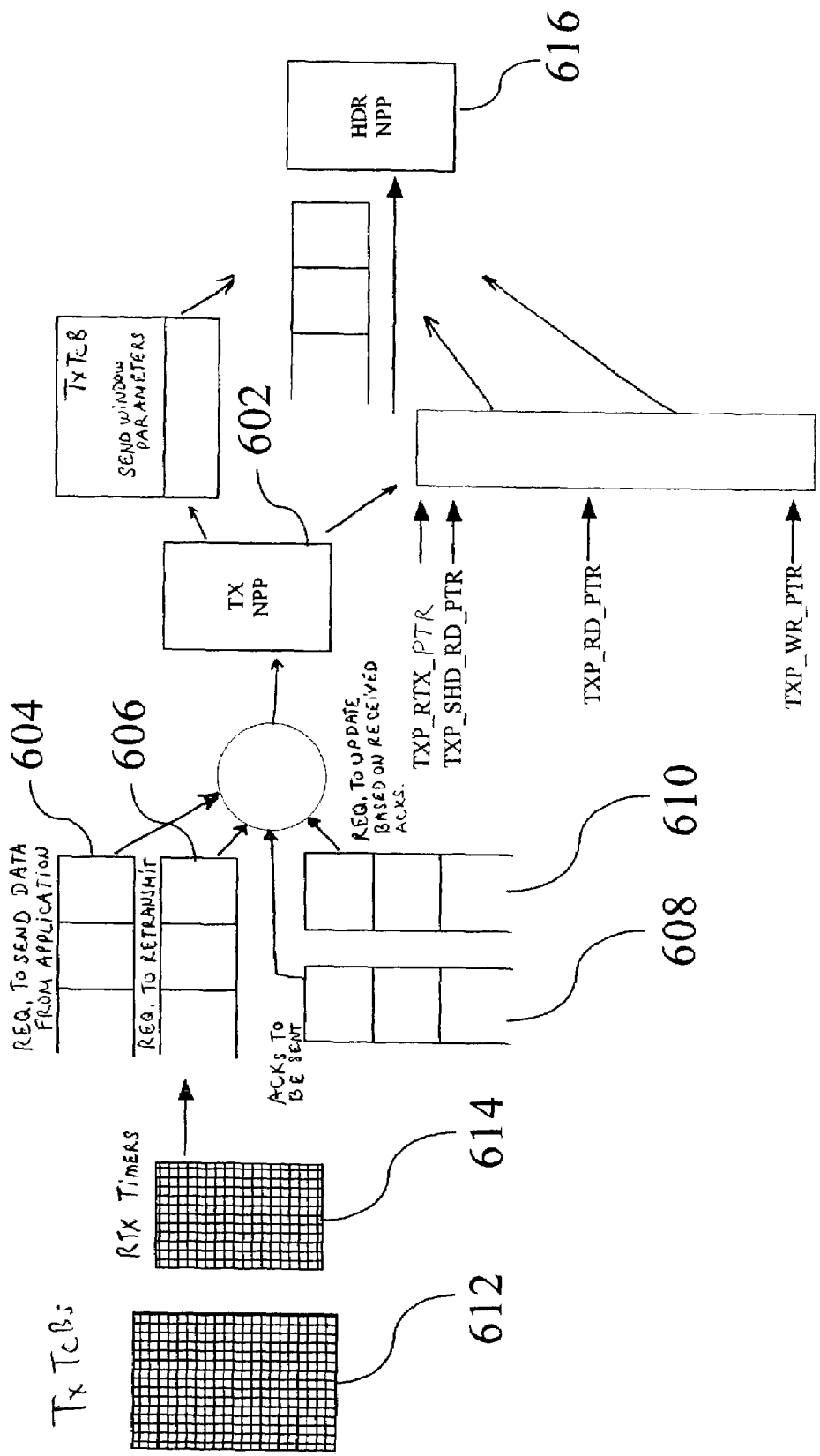
FIG. 6 is a block diagram illustrating, in accordance with one embodiment of the present invention, the transmit operations involving the transmit control block of the present invention.

FIG. 6 is a block diagram illustrating, in accordance with one embodiment of the present invention, the transmit operations involving the transmit control block (Tx TCB) of the present invention. Referring to FIG. 6, there is shown a transmit network protocol processor (TX NPP) 602, representing the processor servicing the transmit operations. In the example of FIG. 6, transmit network protocol processor (TX NPP) 602 represents a micro-code driven engine, or a plurality of micro-code driven engines, which takes in, among others, four different types of requests: Request to send data, request to retransmit, request to send acknowledgement (ACK), and request to update transmit window based on acknowledgement received. In general, these four requests may be serviced concurrently by transmit network protocol processor (TX NPP) 602 using four independently executing threads.

The Requests to send data are typically generated by the application software associated with the transmitting host computer. These requests are queued up in a queue 604 while awaiting to be serviced by transmit network protocol processor (TX NPP) 602. In one embodiment, the content of each queue element of queue 604 includes the pointer to the transmit control block (Tx TCB) associated with the data flow, the pointer to the buffer element where the data is stored, and the length of the data to be transmitted.

Since there may be multiple data flows between a given host computer and another host computer or other host computers, each host computers may have multiple transmit control blocks (Tx TCBs), each associated with a data flow. The plurality of transmit control blocks (Tx TCBs) are shown in FIG. 6 by reference number 612. The transmit control block (Tx TCB) for a given data flow may be found using, for example, the TCP source port (TCP SP), the TCP destination port (TCP DP), the IP destination address (IP DA), and/or the IP source address (IP SA).

The requests to retransmit are typically generated when a retransmit timer expires after some predefined time has passed since a given packet was transmitted, and an acknowledgement has not yet been received. Since there may be multiple data flows between a given host computer and another host computer or other host computers, each host computers may have multiple retransmit timers. The plurality of retransmit timers are shown in FIG. 6 by reference number 614. These requests are queued up in a queue 606 while awaiting to be serviced by transmit network protocol processor (TX NPP) 602. In one embodiment, the content of each queue element of queue 606 includes the pointer to the transmit control block (Tx TCB) associated with the data flow.

The requests to send acknowledgement (ACK) are generated responsive to the successful receipt of data transmitted from the other host computer. These requests are queued up in a queue 608 while awaiting to be serviced by transmit network protocol processor (TX NPP) 602. In one embodiment, the content of each queue element of queue 608 includes the pointer to the transmit control block (Tx TCB) associated with the data flow, the acknowledgement number associated with the data received, and the window size associated with the data received.

The requests request to update transmit window based on acknowledgement received are generated responsive to the acknowledgement received. These requests are queued up in a queue 610 while awaiting to be serviced by transmit network protocol processor (TX NPP) 602. In one embodiment, the content of each queue element of queue 610 includes the receive window size, the acknowledge number received, the pointer to the Tx TCB, and optionally time stamp and SACK information.

In one embodiment, these queues 604, 606, 608, and 610 are serviced by transmit network protocol processor (TX NPP) 602 in a round-robin manner although any other scheme to ensure that the requests in these queues are serviced in an efficient manner may also be employed.

The operation of the transmit network protocol processor (TX NPP) 602 and the role of the transmit control block (Tx TCB) in servicing the requests associated with the transmitting operations may be better understood with reference to the flowcharts of FIGS. 7, 8, 9, and 10 herein. In one embodiment, the processes illustrated in FIGS. 7–10 represent processes offloaded from the host processor of the host computer in order to improve data throughput. By way of example, these processes may be implemented by circuitry comprising one or more network processors and/or embedded processors and/or co-processors operating in parallel with the host processor of the host computer. The aforementioned circuitry may be implemented in an integrated manner with the host computer or may be implemented on a plug-in card, such as a network interface card (NIC), that is configured to be detachably coupled to the bus of the host processor.

Figure 7:
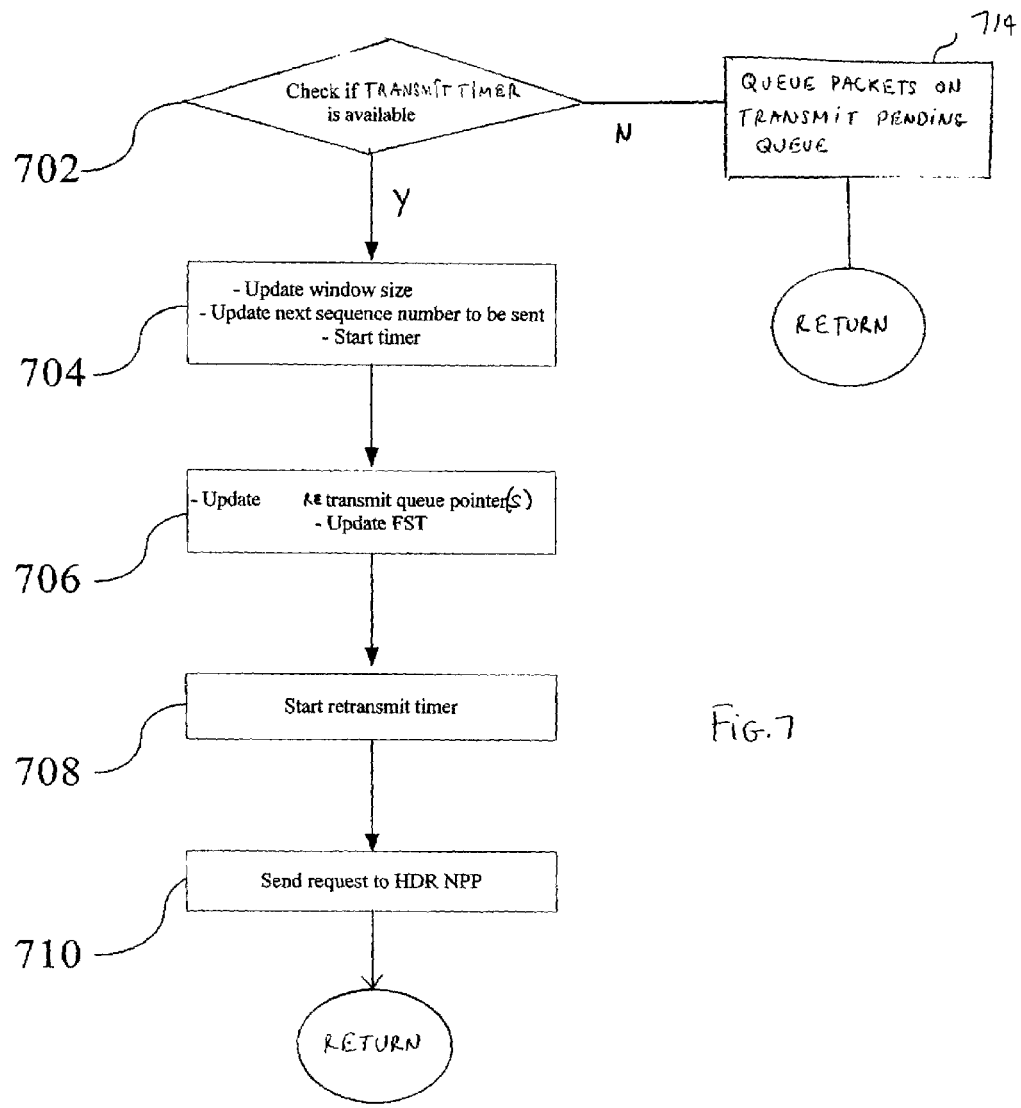
FIG. 7 is a simplified flowchart illustrating, in accordance with one embodiment of the present invention, how the transmit network protocol processor may employ the transmit control block to service a request to transmit data from the host application program associated with the transmitting host computer.

FIG. 7 is a simplified flowchart illustrating, in accordance with one embodiment of the present invention, how transmit network protocol processor (TX NPP) 602 may employ the transmit control block (Tx TCB) to service a request to transmit data from the host application program associated with the transmitting host computer. Once the application requests to send out data, that data is fetched and placed into buffer memory. Each request is associated with a particular data flow, and hence a particular transmit control block (Tx TCB). Using the TCP source port (TCP SP), the TCP destination port (TCP DP), the IP destination address (IP DA) and/or the IP source address (IP SA), the transmit control block (Tx TCB) associated with the request is then obtained. The request is then placed into queue 604 to be serviced by transmit network protocol processor (TX NPP) 602 as discussed earlier.

In block 702, the method first check to see whether the transmit window is available to send the requested data. With reference to FIG. 3, the current window size is obtained from the transmit control block (Tx TCB), and more particularly, from the parameter SND_WIN 316 of the associated transmit control block (Tx TCB). If the window is available to transmit the requested data packet, the method performs certain housekeeping functions prior to sending the requested data packets onward to be sent out. Thus, the method proceeds to block 704 to update the transmit window size of the transmitting host computer (SND_WIN) 316, i.e., to reduce the size of the transmit window as part of transmit window management. Further, the method may also update the sequence number to be sent next (SND_NXT) 322 so that that the sequence number to be sent next (SND_NXT) 322 can reflect the next sequence number to be used for transmitting the next packet. Additionally, the method may also update TMR_SEQ_NUM 332, thereby starting a timer so that the delay can be measured once the acknowledgement is received.

In block 706, the method also places the transmitted packet(s) into retransmit queue 502, where they will stay until an acknowledgement is received. Thus, the Transmit Pending Read Pointer (TXP_RD_PTR) 346 is advanced. Furthermore Frame Transmit Timer FST 340 is also updated.

In block 708, the retransmit timer 614 is started for this data flow if it has not been started earlier. In block 710, the request, along with the transmit control block (Tx TCB) pointer, is send from transmit network protocol processor (TX NPP) 602 to Header Preparation Network Protocol Processor (HDR NPP) 616 (see FIG. 6) to prepare the header along with the data to send to the receiving host computer.

In one embodiment, the following information is transmitted from transmit network protocol processor (TX NPP) 602 to header preparation processor (HDR NPP) 616 to facilitate the preparation of a data packet (including the packet header) for transmission: pointer to the buffer where the data resides, transmit control block (Tx TCB) pointer, sequence #, length, acknowledge #, window size, and flags such as PSH, ACK, or URG (which are used in the TCP header). Once transmit network protocol processor (TX NPP) 602 sends this information to header preparation processor (HDR NPP) 616, the process for servicing the current transmission request ends.

On the other hand, if the transmit window is not available (as determined in block 702), the method proceeds from block 702 to block 714 to queue the packet on the transmit pending queue. Thus Transmit Pending Write Pointer (TXP_WR_PTR) 344 is updated to reflect the fact that the packet has been queued at the tail of the pending transmit queue.

Figure 8:
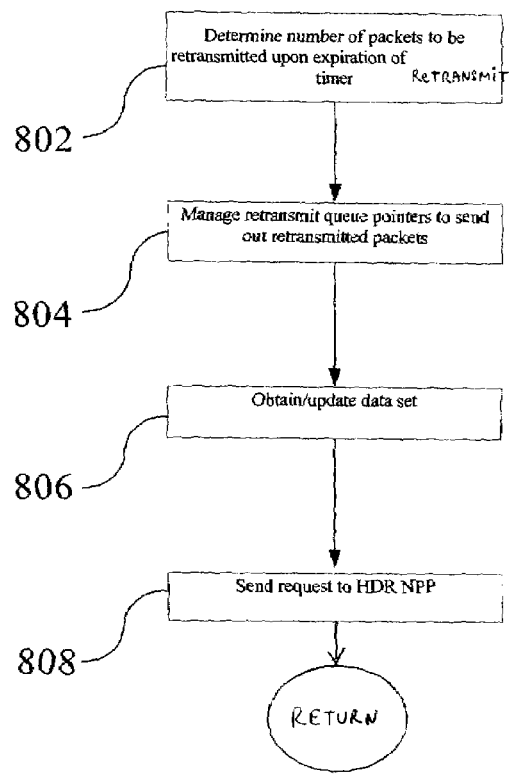
FIG. 8 is a simplified flowchart illustrating, in accordance with one embodiment of the present invention, how the transmit network protocol processor may employ the transmit control block to service a request to retransmit data from retransmit queue.

FIG. 8 is a simplified flowchart illustrating, in accordance with one embodiment of the present invention, how transmit network protocol processor (TX NPP) 602 may employ the transmit control block (Tx TCB) to service a request to retransmit data from retransmit queue 502. The process of FIG. 8 is invoked when the retransmit timer RTX TMR 614 associated with this data flow has expired. In this case, the process will send out one or more MSS-size packets (maximum segment size) from the retransmit queue, the exact number of MSS to be sent depends on ICNG_WND (324), which tracks congestion.

In block 804, the packets to be retransmitted (the exact number of which is determined in block 802) are sent out. As far as the management of retransmit queue 502 is concerned, this involves keeping Retransmit Shadow Pointer (TXP_SHD_RD_PTR) 350 at the head of retransmit queue 502 and moving Retransmit Read Pointer (TXP_RTX_PTR) 348 to reflect the number of packets sent out.

In block 806, a set of data is acquired from both the retransmit queue element(s) associated with the packet(s) to be retransmitted and the associated transmit control block (Tx TCB). For example, data such as the buffer pointer, the sequence number, the length of the data to be retransmitted may be obtained from the retransmit queue element. From the associated transmit control block (Tx TCB), the data obtained may include the acknowledgement number, the receive window size (354 of FIG. 3). Furthermore, since a retransmit is about to be performed, the process adjusts the current congestion window (ICNG_WIN/CNG_WIN) 324. As mentioned earlier, the transmit window is reduced after data is transmitted or retransmitted until acknowledgement is received.

In block 808, the retransmit request along with the transmit control block (Tx TCB) pointer is send from transmit network protocol processor (TX NPP) 602 to header preparation processor (HDR NPP) 616 (see FIG. 6) to prepare the header along with the retransmit data to send to the receiving host computer. In one embodiment, the following information is transmitted from transmit network protocol processor (TX NPP) 602 to header preparation processor (HDR NPP) 616 to facilitate the preparation of a data packet (including the packet header) for transmission: pointer to the buffer where the data resides, transmit control block (Tx TCB) pointer, sequence #, length, acknowledge #, window size, and TCP-related flags such as PSH, ACK, or URG. Once transmit network protocol processor (TX NPP) 602 sends this information to header preparation processor (HDR NPP) 616, the process for servicing the current retransmit request of FIG. 8 ends.

Figure 9:
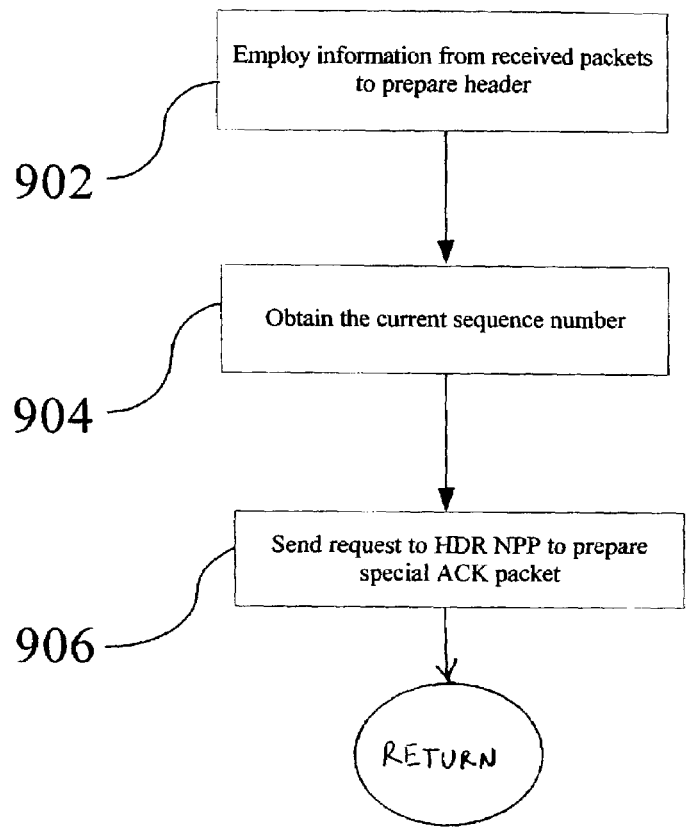
FIG. 9 is a simplified flowchart illustrating, in accordance with one embodiment of the present invention, how the transmit network protocol processor may employ the transmit control block to send an acknowledgement to the other transmitting host computer.

FIG. 9 is a simplified flowchart illustrating, in accordance with one embodiment of the present invention, how transmit network protocol processor (TX NPP) 602 may employ the transmit control block (Tx TCB) to send an acknowledgement to the other transmitting host computer. The process of FIG. 8 is invoked after the host computer has successfully received data packet(s) from the other transmitting host computer. In block 902, it is recognized that one or more data packet(s) has been successfully received at the host computer. Based on the received data sequence, the Rx process prepares the ACK # to be sent and the receive window size and queues the request to TX NPP to send the ACK. Furthermore, the information in the received data packet(s) is also employed to obtain a pointer to the transmit control block (Tx TCB) associated with this data flow. In block 904, the current sequence number is obtained from the sequence number to be sent next (SND_NXT) 322.

In block 906, the information obtained in blocks 902 and 904 is sent to header preparation processor (HDR NPP) 616 to prepare a special acknowledgement packet to be sent to the other transmitting host computer. In one embodiment, the following information is transmitted from transmit network protocol processor (TX NPP) 602 to header preparation processor (HDR NPP) 616 to facilitate the preparation of an acknowledgement packet (including the packet header) for transmission: transmit control block (Tx TCB) pointer, sequence #, length, acknowledge #, window size. Once transmit network protocol processor (TX NPP) 602 sends this information to header preparation processor (HDR NPP) 616, the process for sending an acknowledgement of FIG. 9 ends.

Figure 10:
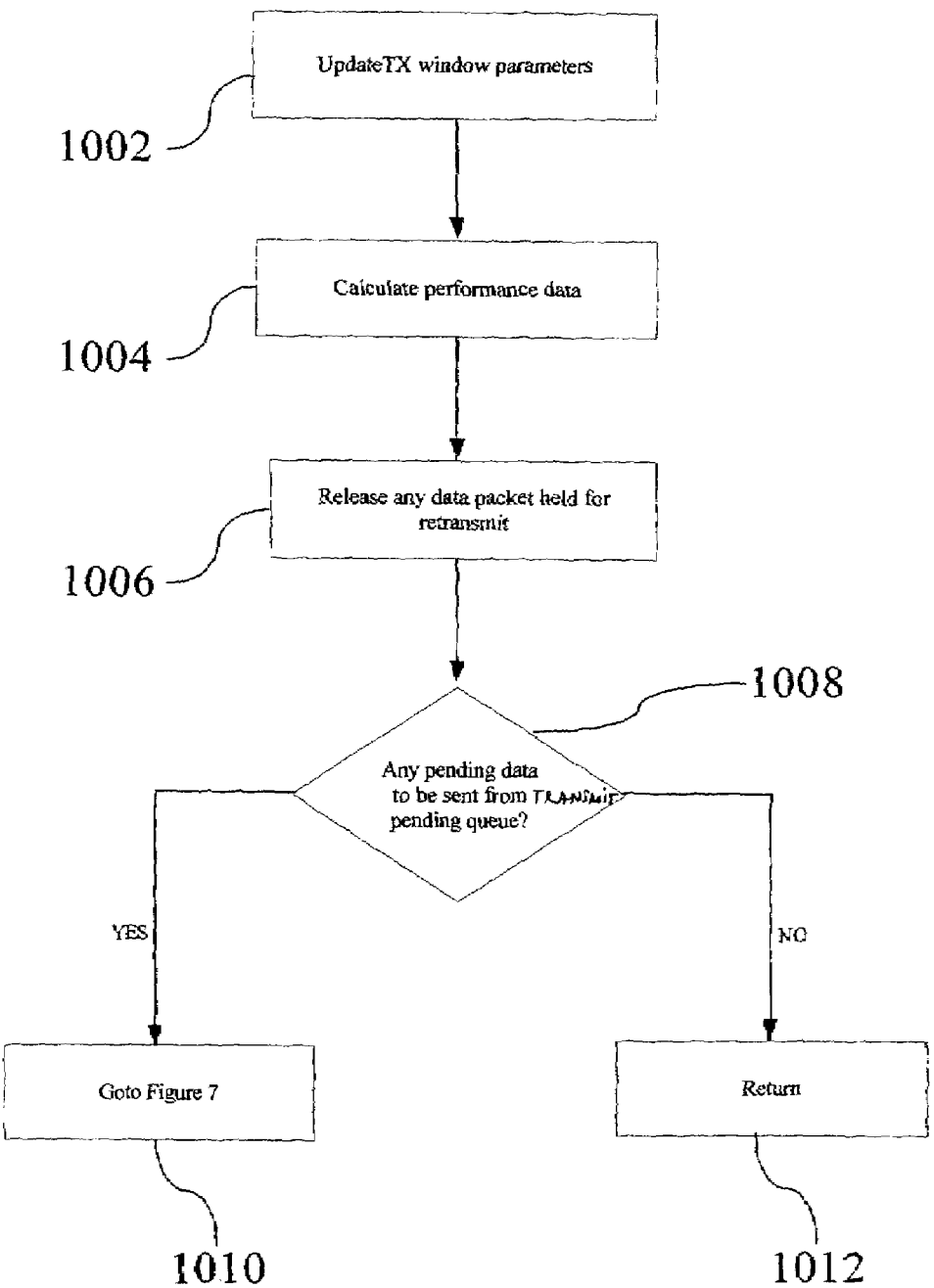
FIG. 10 is a simplified flowchart illustrating, in accordance with one embodiment of the present invention, how the transmit network protocol processor may involve the transmit control block in updating the transmit window and calculating performance data responsive to a received acknowledgement message sent from the other transmitting host computer.

FIG. 10 is a simplified flowchart illustrating, in accordance with one embodiment of the present invention, how transmit network protocol processor (TX NPP) 602 may involve the transmit control block (Tx TCB) in updating the transmit window and calculating performance data responsive to a received acknowledgement message sent from the other transmitting host computer. Generally speaking, there are two main tasks that need to be handled: (1) updating the parameters that manage the transmit window and, as a result, sending out data packets if the updated window size allows such transmitting, and (2) calculating performance data based on the information in the transmit control block (Tx TCB) and the information received in the acknowledgement message.

In block 1002, the TX window parameters are updated. As can be seen, the parameters updated are the window size of the transmitting host computer (SND_WIN) 316, the old unacknowledged sequence number (OLD_UNA) 320, the Frame Transmit Timer FST 340, and TMR_SEQ_NUM 332. In block 1004, performance data is calculated and the following parameters are updated: Retransmission Time Out value RTO 334, Smoothened Round Trip Time (SRTT) 338, Measured Round Trip Time (MRTT) 336.

In block 1006, the process releases any data packet(s) held for retransmit (as a result of an earlier transmit from either transmit pending queue 504 or retransmit queue 502) if such data packet(s) pertain to the received acknowledgement message. Thus, the process updates Retransmit Shadow Pointer (TXP_SHD_RD_PTR) 350 and/or Retransmit Read Pointer (TXP_RTX_PTR) 348 as appropriate. In block 1008, the process determines whether there is any pending data packets in transmit pending queue 504 to be sent out.

In one embodiment, if the difference between the head of transmit pending queue 504 (i.e., Transmit Pending Read Pointer (TXP_RD_PTR) 346) and the tail of transmit pending queue 504 (i.e., Transmit Pending Write Pointer (TXP_WR_PTR) 344) is greater than zero, the process deems there is pending data packets awaiting transmittal. In this case, the process outputs a request to cause the transmit network protocol processor (TX NPP) to invoke the process of FIG. 7 to perform data transmittal. This is seen in block 1010. On the other hand, if there is no more pending data packets in transmit pending queue 504 (as determined in block 1008), the process of FIG. 10 ends at block 1012.

Figure 11:
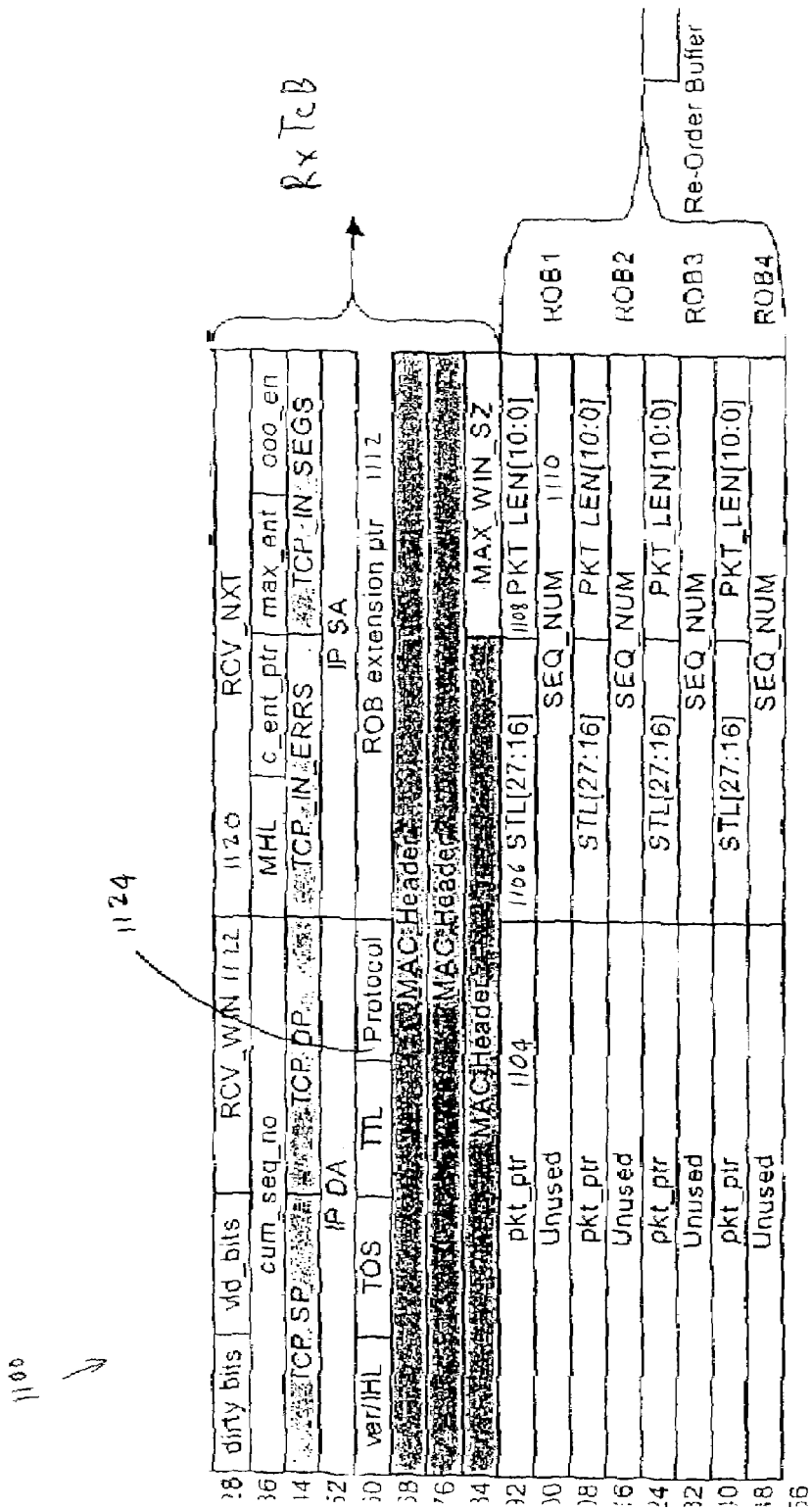
FIG. 11 illustrates, in accordance with one embodiment of the present invention, an exemplary receive control block (Rx TCB) data structure.

As mentioned earlier, the use of a separate transmit control block (Tx TCB) and a separate receive control block (Rx TCB) to handle the transmitting and receiving tasks simultaneously at a given host computer for a given data flow eliminates the bandwidth bottleneck found in the prior art when a transmit control block is employed for both the transmitting and receiving tasks for the data flow. FIG. 11 illustrates, in accordance with one embodiment of the present invention, an exemplary receive control block (Rx TCB) data structure 1100. Rx TCB 1100 is employed to store receive-facilitating parameters, i.e., parameters employed to facilitate the receive process. Receive control block (Rx TCB) 1100 has, among others, parameters to enable a plurality of functions, including: reordering out-of-order packets, allowing the receive network protocol processor (RCV NPP), instead of the transmit network protocol processor (TX NPP), to send out an acknowledgement packet, and maintaining Rx window size on a connection-by-connection basis.

With respect to out-of-order packet reordering, there is provided, in accordance with one aspect of the present invention, a method for partially reordering out-of-order packets so as to render the packet receiving process more bandwidth efficient. Suppose the receive network protocol processor (RCV NPP) was expecting packets having sequence numbers 1 to 1000. However, before the packets having sequence numbers 1–1000 are received, the receive network protocol processor (RCV NPP) receives instead packets having sequence numbers 1002 to 64,000. In some prior art implementations, these out-of-order packets would be discarded, requiring the transmitting host computer to send them again after the expected packets (i.e., those having sequence numbers 1–1000) are received.

In accordance with one aspect of the present invention, the receive network protocol processor (RCV NPP) would keep the packets having sequence numbers 1002 to 64,000, partially reordering them as necessary, but store them in the out-of-order buffers instead of sending them to the host software within the receiving host computer. The partially ordered packets may be stored, for example, in a linked list using the sequence number of the packets as the key.

By partially reordering the out-of-order packets (the re-ordering is only partial since packets having sequence numbers 1–1000 are still missing), the packets having sequence numbers 1–64,000 can be very quickly assembled once the packets having sequence numbers 1–1000 arrive. This rapid assembly permits the receive network protocol processor (RCV NPP) to more quickly send the complete data to the higher layer software. Furthermore, by reducing the amount of retransmission that the transmitting host computer has to perform, the invention effectively increases the bandwidth of the communication channel between the two host computers. This aspect of the invention is discussed in greater detail in a co-pending application Ser. No. 10/233, 304 entitled "Methods And Apparatus For Handling Out-Of-Order Packets," filed on even date and incorporated by reference.

In receive control block (Rx TCB) 1100, there is shown a plurality of reorder buffers (ROBs): ROB1, ROB2, ROB3, and ROB4. There may be as many reorder buffers as desired although only four are shown. Each ROB is employed to store parameters associated with an out-of-order packet. The parameters associated with each ROB includes the following: Pointer to the data (PKT_PTR), Storage Transport Layer Header (STL, which is employed for Fiber Channel Frame Reassembly), Length of current packet (PKT_LEN), and Sequence number of current packet (SEQ_NUM).

With reference to ROB1, for example, these four parameters are shown by reference numbers 1104, 1106, 1108, and 1110 respectively. To provide for storage flexibility and to avoid making each receive control block (Rx TCB) unduly large, the out-of-order buffers may be extended into the memory space of the host computer system. Thus, if a greater number of reorder buffers are required beyond what is provided in the receive control block (Rx TCB) data structure, a pointer (ROB EXTENSION PTR) 1112 is provided, which points to a location in the memory space of the host computer system where the extension reorder buffers may be found.

The role of the receive control block (Rx TCB) in the data receiving operations may be better understood with reference to FIGS. 12A–14 that follow. In one embodiment, the processes illustrated in FIGS. 12A–14 represent processes offloaded from the host processor of the host computer in order to improve data throughput. By way of example, these processes may be implemented by circuitry comprising one or more network processors and/or embedded processors and/or co-processors operating in parallel with the host processor of the host computer. The aforementioned circuitry may be implemented in an integrated manner with the host computer or may be implemented on a plug-in card, such as the aforementioned network interface card (NIC), that is configured to be detachably coupled to the bus of the host processor.

Figure 12A:
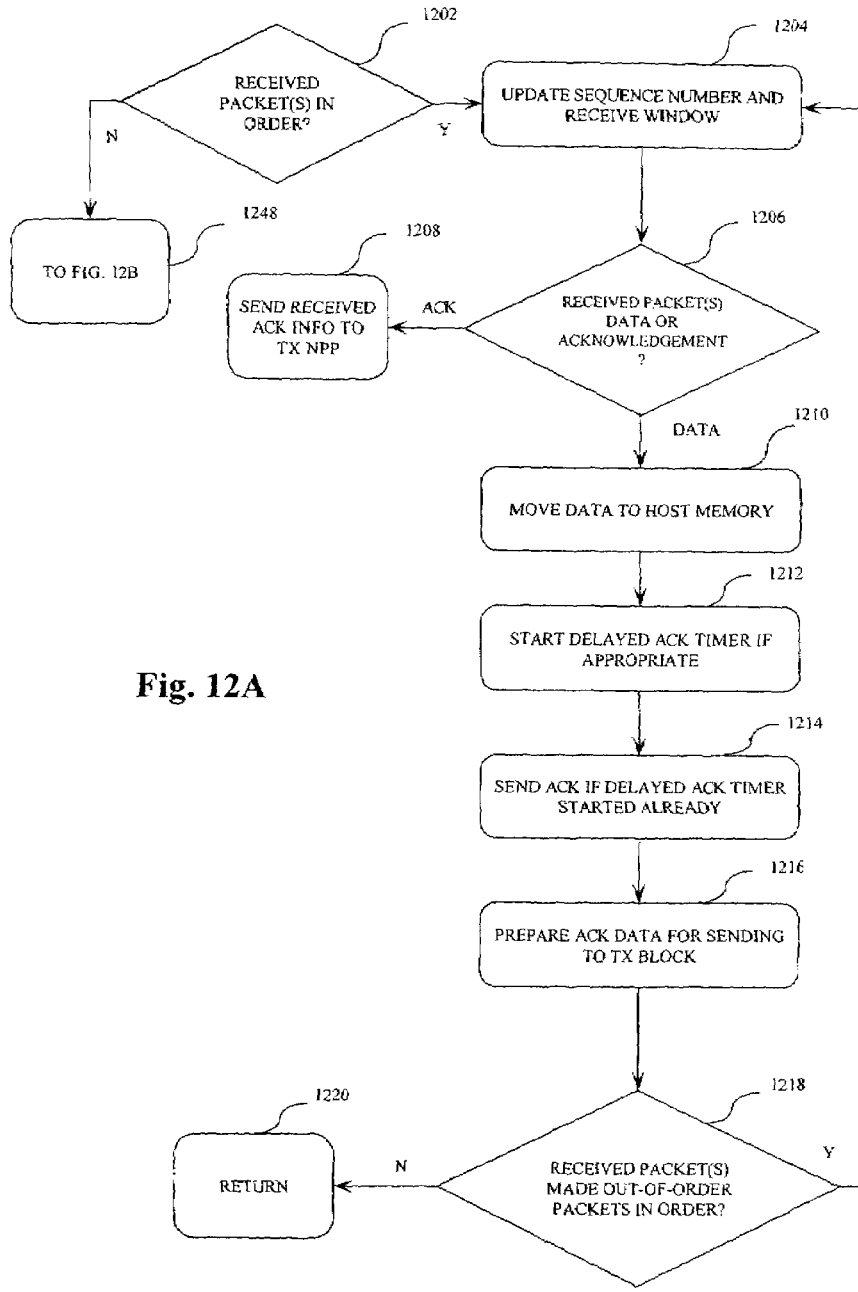
FIGS. 12A and 12B show, in accordance with embodiments of the present invention, exemplary steps for receiving data packets using the receive control block (Rx TCB).

FIG. 12A shows, in accordance with one embodiment of the present invention, exemplary steps for receiving data packets using the receive control block (Rx TCB). In block 1202, the sequence number(s) of the received data packet(s) are compared with the expected sequence number(s), which are stored by RCV_NXT 1120 in the receive control block (Rx TCB). The receive control block (Rx TCB) for the received packet may be found using information such the TCP source port, the TCP destination port, the IP source address, and/or the IP destination address. If the two match, then the received packet(s) are deemed in order and the method proceeds to block 1204. On the other hand, if there is a discrepancy, the received packet(s) are deemed out of order, and the method proceeds to block 1248, which is described further in FIG. 12B herein.

In block 1204, the method updates RCV_NXT 1120, which updates the sequence number expected for the next packet(s) received. Furthermore, the receive window is updated by updating RCV_WIN 1122, which reduces the receive window size temporarily until data is sent from the receive network protocol processor (RCV NPP) to the application software in the receiving host computer.

Once updating is performed in block 1204, the method proceeds to block 1206 wherein the method decides whether the received packet pertains to received acknowledgement for data sent earlier from this host computer, or whether the received data packet pertains to data, other than an acknowledgement, sent from the other transmitting host computer. If the received data packet pertains to an acknowledgement associated with data sent earlier from this host computer, the method proceeds to block 1208 wherein the received acknowledgement is sent to the transmit network protocol processor (TX NPP) so that the transmit network protocol processor (TX NPP) can update its window, calculate performance data, and the like. This aspect has been discussed earlier in connection with FIG. 10 herein.

On the other hand, if the received data packet pertains to data, other than an acknowledgement, sent from the other transmitting host computer, the method proceeds to block 1210 wherein the data is moved into the host computer's memory, e.g., into the host buffer memory space, for use by the host software application. In blocks 1212 and 1214, the acknowledgement procedure is undertaken. In one embodiment, a cumulative acknowledgement scheme is employed (but not required in every implementation). Under the cumulative acknowledgement scheme, an acknowledgement is sent out for every other packet received to optimize bandwidth. Thus, in block 1212, a delayed acknowledgement timer is started if it has not been started already.

On the other hand, in block 1214, if the delayed acknowledgement timer has already started, the method stops the timer and proceeds to send out an acknowledgement to the other transmitting host computer. In any event, if the delayed acknowledgement timer expires, an acknowledgement is sent out to the transmitting host computer, in which case the acknowledgement only pertains to the one (instead of two) packets received. Generally speaking, the delayed acknowledgement timer may be set to a given value, e.g., 100 ms. When the delayed acknowledgment timer expires, a request is then queued in the Rx NPP queue.

In block 1216, the method sends the data necessary to create an acknowledgement packet to the transmit network protocol processor (TX NPP) of the host computer to send out an acknowledgement. This data includes, for example, the acknowledgement number, the window size, and the pointer to the transmit control block (Tx TCB). This procedure has been described earlier in connection with FIG. 9 herein. The Rx NPP also has the option to send out an acknowledgement by itself. For example, the Rx NPP may send an immediate acknowledgement if it receives out-of-order data, duplicate data, or Rx window probe.

In block 1218, the method checks to determine whether the newly received data packets made the earlier partially reordered packets, which are stored in the reordered buffers, in order. If not, the process returns in block 1218. On the other hand, if the receipt of the newly received data packets made the earlier partially reordered packets in order, the method proceeds to block 1204 again to send out all the ordered packets to the host application buffer space and to send out acknowledgement for the same.

Figure 12B:
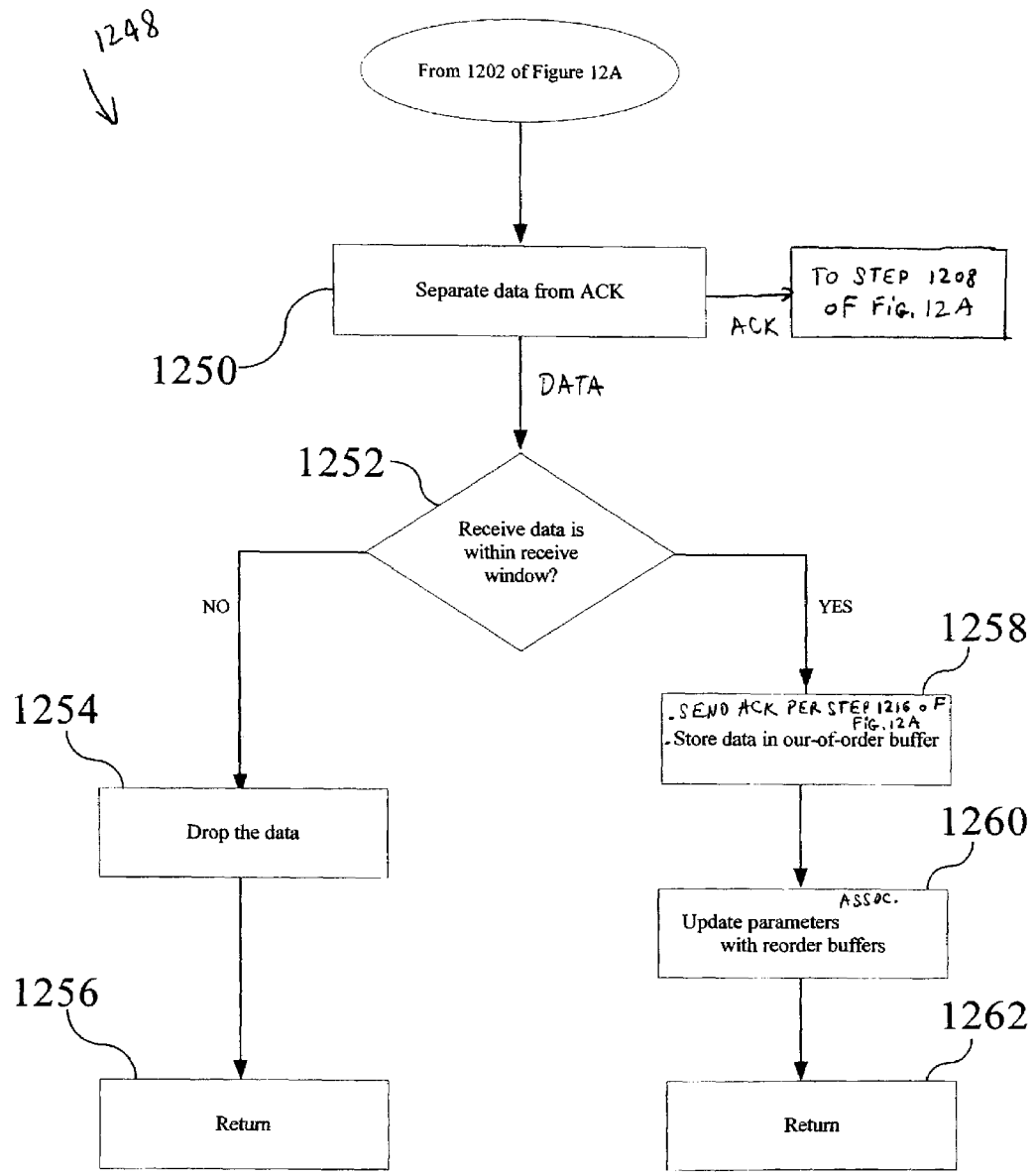

FIG. 12B represents the situation in FIG. 12A wherein the received packet is found to be out of order (as determined by block 1202 of FIG. 12A). In block 1250, the received packet is examined to determine whether it is an acknowledgement from the other transmitting host computer for data previously sent by this host computer or it is data, other than an acknowledgement, sent by the other transmitting host computer. If the received packet is found to be an acknowledgement, the method proceeds to step 1208 of FIG. 12A, i.e., the acknowledgement data is sent to the transmit network protocol processor (TX NPP) in order to allow the transmit network protocol processor (TX NPP) to, among other tasks, update its window, calculate performance data, and the like.

On the other hand, if the received packet is found to be out of order data, other than an acknowledgement, sent from the other transmitting host computer, the method proceeds to block 1252 to determine whether the received data fits within the receive window. The receive window may be currently narrow because the host computer received a chunk of data earlier and has not completely moved the data received earlier into the application buffer memory, and thus can accept only a limited amount of new data. If the data does not fit within the received window, the method proceeds to block 1254 wherein the received data is simply discarded. Thereafter, the method returns to wait for the arrival of new data. This is shown in block 1256.

On the other hand, if the received data fits within the window, the method proceeds to block 1216 of FIG. 12A, i.e., it sends the received data, along with the receive control block (Rx TCB) to have the acknowledgement packet prepared and sent out by the transmit network protocol processor (TX NPP). The acknowledgement, in this case, will indicate to the other transmitting computer that the packets are received but they are out of order.

Each ROB is employed to store parameters associated with an out-of-order packet. The parameters associated with each ROB includes the following: Pointer to the data (PKT_PTR 1104), Storage Transport Layer Header (STL 1106), Length of current packet (PKT_LEN 1108), and Sequence number of current packet (SEQ_NUM 1110).

Further, the received data is stored in the out-of-order buffer as shown in block 1258. As discussed earlier, this out-of-order buffer is managed by parameters such as PKT_PTR 1104, STL 1106, PKT_LEN 1108, and SEQ_NUM 1110 in a linked list of reorder buffers, which is maintained in the receive control block (Rx TCB) and extends into the memory of the host computer as needed via the use of the buffer extension pointer ROB EXTENSION PTR 1112. Thus, in block 1260, the parameters associated with the reorder buffers in the receive control block (Rx TCB) are updated. Note that the Storage Transport Layer Header (STL) parameter associated with the reorder buffers is modified only if the protocol (indicated by PROTOCOL 1124 in the receive control block (Rx TCB)) indicates that the current protocol is Fiber Channel over IP (FC/IP) over TCP/IP. Thereafter, the method returns to wait for the arrival of new data. This is shown in block 1262.

The separation of the transmit network protocol processor (TX NPP) from the receive network protocol processor (RCV NPP), in addition to the separation of the transmit control block (Tx TCB) from the receive control block (Rx TCB), advantageously allows the host computer to communicate at a higher transmission bandwidth. As mentioned above, each of the transmit network protocol processor (TX NPP) and receive network protocol processor (RCV NPP) executes their own threads for handling a variety of requests. Between the transmit network protocol processor (TX NPP) and the receive network protocol processor (RCV NPP), there is a substantial amount of required coordination.

In accordance with one aspect of the present invention, the receive network protocol processor (RCV NPP) passes data onto the transmit network protocol processor (TX NPP) on at least two occasions to update the transmit control block (Tx TCB) and other parameters associated with the transmit process. These two occasions include the receipt of an acknowledgement from the other transmitting host computer, and the receipt of data sequence information, which allows the transmit network protocol processor (TX NPP) to send an acknowledgement to the other transmitting host computer.

In the exemplary embodiment illustrated by FIG. 13, the receipt of one or more acknowledgement packets from the other transmitting host computer causes the receive network protocol processor (RCV NPP) 1302 to queue data associated with the received acknowledgement packet(s) into a queue 1304. Transmit network protocol processor (TX NPP) 1306 takes queue elements from queue 1304 in order to update its transmit control block (Tx TCB), the window size, calculate performance data, update the retranmsit buffer, and the lik. The TX NPP may then update the RX window based on the received acknowledgement. Furthermore, it may also update the send ACK # and the window size.

Among the information sent by receive network protocol processor (RCV NPP) 1302 to transmit network protocol processor (TX NPP) 1306 are the acknowledgement number, the time stamp value reflecting the time the packet(s) for which the acknowledgement is sent is received by the other transmitting host computer (the time stamp value is employed by the transmit network protocol processor (TX NPP) to calculate the delay based on the current time value), information associated with selective acknowledgement blocks such as the start sequence number (START_SEQ) and the associated length, the window size information from the other host transmitting computer, and the pointer to the transmit control block (Tx TCB).

In the exemplary embodiment illustrated by FIG. 14, the receive network protocol processor (RCV NPP) sends information to the transmit network protocol processor (TX NPP) to send out an acknowledgement. This may occur because the delayed acknowledgement timer has expired or because two packets back-to-back has been received and an acknowledgement should be sent. The receive network protocol processor (RCV NPP) 1402 queues requests to send acknowledgement into a queue 1404. Transmit network protocol processor (TX NPP) 1406 takes queue elements from queue 1404 in order to computer parameters necessary to send out an acknowledgement and also to update the transmit control block (Tx TCB) (e.g., thee latest ACK and window size sent).

Among the information sent by receive network protocol processor (RCV NPP) 1402 to transmit network protocol processor (TX NPP) 1406 are the sequence number and the length, which allows the transmit network protocol processor (TX NPP) to calculate the acknowledgement number. Other information includes the window size to be sent to the other transmitting host computer, and the pointer to the transmit control block (Tx TCB). This information taken off the top of queue 1404 will be forwarded by transmit network protocol processor (TX NPP) 1406 to the header preparation processor (HDR NPP) create an acknowledgement packet for sending to the other host transmitting computer.

Thus, while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. Circuitries for facilitating data exchange via a network, said circuitries being associated with a first host computer coupled to said network, said network also being coupled to a second host computer, said circuitries comprising:

means for facilitating transmitting first data associated with a bi-directional data flow from said first host computer to said second host computer, said first data being transmitted using the TCP protocol, said means for facilitating transmitting being associated with said first host computer and is configured for storing transmit-facilitating parameters associated with transmitting said first data using said TCP protocol; and means for facilitating receiving second data associated with said bi-directional data flow, said second data being transmitted from said second host computer to said first host computer using said TCP protocol, said means for facilitating receiving being associated with said first host computer and is configured for storing receive-facilitating parameters associated with receiving said second data using said TCP protocol, wherein said means for facilitating transmitting and said means for facilitating receiving are employed simultaneously to facilitate simultaneous transmitting said first data and receiving said second data by said circuitries.

2. The circuitries of claim 1 wherein said means for facilitating transmitting and said means for facilitating receiving are implemented on a network interface card (NIC card) that is configured to be detachably coupled to a bus of said first host computer.

3. The circuitries of claim 1 further comprising means for ordering out-of-order packets received at said first host computer before a packet having a correct packet number arrive at said first host computer.

4. The circuitries of claim 3 wherein said means for ordering said out-of-order packets employs buffer parameters stored in said means for facilitating receiving.

5. On a network interface card (NIC card) coupled to a first host computer, a method for exchanging data via a network coupled to said first host computer and a second host computer, said method comprising:

transmitting, using transmit-facilitating parameters stored in a first Transmit Control Block (Tx TcB) associated with said NIC card, first data associated with a bi-directional data flow, said first data being transmitted from said first host computer to said second host computer, said first data being transmitted using the TCP protocol; and receiving, using receive-facilitating parameters stored in a first Receive Control Block (Rx TcB) associated with said NIC card, second data associated with said bi-directional data flow, said second data being transmitted from said second host computer to said first host computer, said second data being transmitted using the TCP protocol, wherein said Tx TcB and said Rx TcB are employed to facilitate simultaneous transmitting said first data and receiving said second data by said NIC card.

6. The method of claim 5 further comprising transmitting, using said first Tx TCB, third data from said first host computer to said second host computer, at least a portion of said third data being obtained from a portion of said second data by circuitries of said NIC card after said second data is received at said NIC card.

7. The method of claim 6 wherein said portion of said third data is obtained from said portion of said second data without requiring said portion of said second data to be processed outside of said NIC card.

8. The method of claim 7 wherein said third data pertains to an acknowledgement acknowledging that said second data has been received at said integrated circuit associated with said first host computer.

9. The method of claim 5 wherein said first data is received at said second host computer using a second Rx TCB, said second Rx TCB being associated with said second host computer and is configured for storing receive-facilitating parameters associated with receiving said first data at said second host computer using said TCP protocol.

10. The method of claim 9 wherein said second data is transmitted from said second host computer using a second Tx TCB, said second Tx TCB being associated with said second host computer and is configured for storing transmit-facilitating parameters associated with transmitting said second data from said second host computer using said TCP protocol.

11. The method of claim 5 wherein said receiving said second data further includes ordering out-of-order packets received at said NIC card before a packet having a correct packet number arrive at said NIC card.

12. The method of claim 11 wherein said ordering said out-of-order packets employs buffer parameters stored in said first Rx TcB.

13. In a first host computer coupled to a network, a method for exchanging data with a second host computer also coupled to said network, said method comprising:

employing a first Transmit Control Block (Tx TCB) to facilitate transmitting first data associated with a bi-directional data flow from said first host computer to said second host computer, said first data being transmitted using the TCP protocol, said first Tx TCB being associated with said first host computer and is configured for storing transmit-facilitating parameters associated with said transmitting said first data using said TCP protocol; and employing a first Receive Control Block (Rx TCB) to facilitate receiving second data associated with said bi-directional data flow, said second data being transmitted from said second host computer to said first host computer using said TCP protocol, said first Rx TCB being associated with said first host computer and is configured for storing receive-facilitating parameters associated with said receiving said second data using said TCP protocol, wherein said first Tx TCB and said first Rx TCB are employed to simultaneously service a transmit request pertaining said first data and a receive request pertaining said second data.

14. The method of claim 13 wherein said first Tx TCB and said first Rx TCB are implemented in an integrated circuit other than a host processor of said first host computer.

15. The method of claim 13 wherein said first Tx TCB and said first Rx TCB are implemented on a network interface card (NIC card) that is configured to be detachably coupled to a bus of said first host computer.

16. The method of claim 15 wherein said employing said first Tx TCB and said employing said first Rx TCB represent processes offloaded from a host processor of said first host computer.

17. The method of claim 16 further comprising employing said first Tx TCB to transmit third data from said first host computer to said second host computer, a first portion of said third data being obtained from a portion of said second data by circuitries of said integrated circuit after said second data is received, a second portion of said third data being obtained from said transmit-facilitating parameters in said Tx TCB.

18. The method of claim 17 wherein said first portion of said third data is obtained from said portion of said second data without requiring said portion of said second data to be processed outside of said NIC card.

19. The method of claim 18 wherein said third data pertains to an acknowledgement acknowledging that said second data has been received at said first host computer.

20. The method of claim 13 wherein said first data is received at said second host computer using a second Rx TCB, said second Rx TCB being associated with said second host computer and is configured for storing receive-facilitating parameters associated with receiving said first data at said second host computer using said TCP protocol.

21. The method of claim 20 wherein said second data is transmitted from said second host computer using a second Tx TCB, said second Tx TCB being associated with said second host computer and is configured for storing transmit-facilitating parameters associated with transmitting said second data from said second host computer using said TCP protocol.

22. The method of claim 13 further comprising employing a set of Tx TCBs to facilitate transmitting data associated with a set of bi-directional data flows between said first host computer and a set of other host computers, said set of Tx TCBs being associated with said first host computer, each of said set of Tx TCBs being configured to store transmit-facilitating parameters to facilitate transmitting data with a respective one of said set of other host computers, said set of other host computers being coupled to said network.

23. The method of claim 22 further comprising employing a set of Rx TCBs to facilitate receiving data associated with said set of bi-directional data flows, said set of Rx TCBs being associated with said first host computer, each of said set of Rx TCBs being configured to store receive-facilitating parameters to facilitate receiving data from said respective one of said set of other host computers, wherein a process for servicing a transmit request associated with one of said set of bi-directional data flows and occurs simultaneously with a process for servicing a receive request associated with said one of said set of bi-directional data flows.

24. The method of claim 13 wherein said employing a first Rx Transmit Control Block (Rx TCB) to facilitate receiving said second data includes ordering out-of-order packets received at said first host computer before a packet having a correct packet number arrive at said first host computer.

25. The method of claim 24 wherein said ordering said out-of-order packets employs buffer parameters stored in said first Rx TCB.

* * * * *